(12) United States Patent
Suzuki

(10) Patent No.: US 10,256,443 B2
(45) Date of Patent: Apr. 9, 2019

(54) BATTERY PACK, ELECTRIC POWER TOOL, AND ELECTRONIC APPARATUS

(71) Applicant: Sony Corporation, Tokyo (JP)

(72) Inventor: Fumihiko Suzuki, Fukushima (JP)

(73) Assignee: Murata Manufactruing Co., Ltd., Kyoto (JP)

(*) Notice: Subject to any disclaimer, the term of this patent is extended or adjusted under 35 U.S.C. 154(b) by 12 days.

(21) Appl. No.: 15/650,456

(22) Filed: Jul. 14, 2017

(65) Prior Publication Data

US 2018/0248157 A1  Aug. 30, 2018

Related U.S. Application Data

(60) Provisional application No. 62/464,689, filed on Feb. 28, 2017.

(51) Int. Cl.
| | |
|---|---|
| *H01M 2/10* | (2006.01) |
| *H01M 10/42* | (2006.01) |
| *H01M 2/20* | (2006.01) |
| *H01M 10/643* | (2014.01) |
| *A62C 3/16* | (2006.01) |
| *H01M 10/658* | (2014.01) |
| *A62D 1/00* | (2006.01) |
| *H01M 10/6235* | (2014.01) |

(52) U.S. Cl.
CPC ............... *H01M 2/105* (2013.01); *A62C 3/16* (2013.01); *H01M 2/1094* (2013.01); *H01M 2/204* (2013.01); *H01M 10/425* (2013.01); *H01M 10/643* (2015.04); *H01M 10/658* (2015.04); *A62D 1/0007* (2013.01); *H01M 10/6235* (2015.04); *H01M 2220/30* (2013.01)

(58) Field of Classification Search
CPC ............... H01M 2/105; H01M 10/425; H01M 2220/30; H01M 10/643; H01M 2/204
USPC ......................................................... 320/112
See application file for complete search history.

(56) References Cited

U.S. PATENT DOCUMENTS

| | | | | |
|---|---|---|---|---|
| 6,344,728 B1* | 2/2002 | Kouzu et al. | ......... | B60L 3/0046 320/116 |
| 6,399,238 B1* | 6/2002 | Oweis et al. | ....... | H01M 2/1077 429/100 |
| 6,455,190 B1* | 9/2002 | Inoue et al. | ........ | H01M 2/0242 320/107 |

(Continued)

FOREIGN PATENT DOCUMENTS

JP      2012-119137 A      6/2012

*Primary Examiner* — Sun Lin
(74) *Attorney, Agent, or Firm* — K&L Gates LLP

(57) ABSTRACT

Provided herein is a battery pack including a plurality of secondary batteries, a containing member, a protective member, and a wiring member. The plurality of secondary batteries include a plurality of terminals at each secondary battery. The containing member contains the plurality secondary batteries to expose the plurality of terminals. The protective member includes a plurality of openings, and the plurality of secondary batteries contained in the containing member are covered with the protective member to expose the plurality of terminals from the plurality of openings. The wiring member is coupled to the plurality of terminals exposed from the plurality of openings. One or both of the containing member and the protective member include one or both of a ceramic material and a polymer material having a heat resistance temperature of 300° C. or higher.

15 Claims, 4 Drawing Sheets

(56) References Cited

U.S. PATENT DOCUMENTS

| | | | | |
|---|---|---|---|---|
| 6,972,544 B2* | 12/2005 | Seman, Jr. et al. | ... | H01M 2/204 320/112 |
| 7,964,311 B2* | 6/2011 | Han et al. | ............ | H01M 2/145 429/251 |
| 8,092,932 B2* | 1/2012 | Phillips et al. | ........... | B25F 5/02 429/100 |
| 8,313,855 B2* | 11/2012 | Muis | .................... | H01M 2/206 429/158 |
| 8,354,186 B2* | 1/2013 | Muis | .................... | H01M 2/206 429/158 |
| 9,263,717 B2* | 2/2016 | Nakano et al. | ....... | H01M 2/105 |
| 10,079,390 B2* | 9/2018 | Matsuno et al. | ...... | H01M 4/661 |
| 2010/0124693 A1* | 5/2010 | Kosugi et al. | ..... | G01R 31/3644 429/92 |
| 2010/0236250 A1* | 9/2010 | Headland et al. | ...... | F23R 3/007 60/753 |

* cited by examiner

BATTERY PACK, ELECTRIC POWER TOOL, AND ELECTRONIC APPARATUS

CROSS-REFERENCE TO RELATED APPLICATION

This application claims the benefit of priority of Provisional Application Ser. No. 62/464,689, filed Feb. 28, 2017, the entire contents of which are incorporated herein by reference.

BACKGROUND

The present technology relates to a battery pack including a plurality of secondary batteries, and an electric power tool and an electronic apparatus that each use the battery pack.

Electronic apparatuses have been widely used, and small and light-weight secondary batteries that have ability to achieve high energy density have been developed as power sources applied to the electronic apparatuses. Applications of the secondary batteries are not limited to the electronic apparatuses described above, and it has been also considered to apply the secondary batteries to other applications such as an electric power tool.

In association with higher performance and more multi-functionality of electronic apparatuses and other apparatuses, a further increase in energy density of the secondary batteries is desired, which causes an increase in an amount of heat generated during use of the secondary batteries. Accordingly, in order to easily and safely handle the secondary batteries, a battery pack is used. The battery pack includes a plurality of secondary batteries contained in a containing member.

Various studies have been conducted on an improvement in safety of the battery pack. More specifically, a container provided to a thermal-conductivity holder contains secondary batteries (unit cells), and an endothermic agent is provided between a containing member and the secondary batteries inside the container (for example, refer to Japanese Unexamined Patent Application Publication No. 2012-119137).

SUMMARY

Specific proposals have been made in order to improve safety of the battery pack; however, the safety of the battery pack is not sufficient yet. For this reason, there is still room for improvement in the safety of the battery pack.

It is therefore desirable to provide a battery pack, an electric power tool, and an electronic apparatus that each make it possible to improve the safety.

According to one embodiment of the present technology, there is provided a battery pack including a plurality of secondary batteries, a containing member, a protective member, and a wiring member. The plurality of secondary batteries each include a plurality of terminals. The containing member contains the plurality of secondary batteries to expose the plurality of terminals. The protective member includes a plurality of openings, and the plurality of secondary batteries contained in the containing member are covered with the protective member to expose the plurality of terminals from the plurality of openings. The wiring member is coupled to the plurality of terminals exposed from the plurality of openings. One or both of the containing member and the protective member include one or both of a ceramic material and a polymer material having a heat resistance temperature of 300° C. or higher.

According to another embodiment of the present technology, there is provided a battery pack including a plurality of secondary batteries, a containing member, a protective member, and a wiring member. The plurality of secondary batteries each include a plurality of terminals. The containing member contains the plurality of secondary batteries to expose the plurality of terminals. The protective member includes a plurality of openings, and the plurality of secondary batteries contained in the containing member are covered with the protective member to expose the plurality of terminals from the plurality of openings. The wiring member is coupled to the plurality of terminals exposed from the plurality of openings. The protective member includes a hydrate-containing material.

According to respective embodiments of the present technology, there are provided an electric power tool and an electronic apparatus each including a battery pack. The battery pack has a configuration similar to one of the battery pack according to the foregoing one embodiment of the present technology and the battery pack according to the foregoing other embodiment of the present technology.

According to the battery pack of the one embodiment of the present technology, one or both of the containing member and the protective member include one or both of the ceramic material and the polymer material having a heat resistance temperature of 300° C. or higher, which makes it possible to improve safety.

According to the battery pack of the other embodiment of the present technology, the protective member includes the hydrate-containing material, which makes is possible to improve safety.

In each of the electric power tool and the electronic apparatus of the respective embodiments of the present technology, similar effects are achievable.

Note that effects described here are non-limiting. Effects achieved by the present technology may be one or more of effects described in the present technology.

It is to be understood that both the foregoing general description and the following detailed description are exemplary, and are provided to provide further explanation of the technology as claimed.

BRIEF DESCRIPTION OF THE DRAWINGS

The accompanying drawings are included to provide a further understanding of the technology, and are incorporated in and constitute a part of this specification. The drawings illustrate embodiments and, together with the specification, serve to explain the principles of the technology.

DETAILED DESCRIPTION

In the following, some embodiments of the present technology are described in detail with reference to drawings. It is to be noted that description is given in the following order.

1. Battery Pack (First Embodiment)
1-1. Whole Configuration
1-2. Configuration of Battery Module
1-3. Measures for Safety
1-4. Configuration of Secondary Battery
1-5. Operation
1-6. Action and Effects
2. Battery Pack (Second Embodiment)
2-1. Measures for Safety
2-2. Action and Effects
3. Modification Examples
4. Applications of Battery Pack
4-1. Various Applications such as Electronic Apparatus
4-2. Electric Power Tool <1. Battery Pack (First Embodiment)>

First, description is given of a battery pack according to a first embodiment of the present technology.

The battery pack described here is a power source mounted in, for example, an electronic apparatus. The kind of the electronic apparatus is not particularly limited. Specific applications of the battery pack are described later.

<1-1. Whole Configuration>

First, description is given of a whole configuration of the battery pack.

Figure 1:
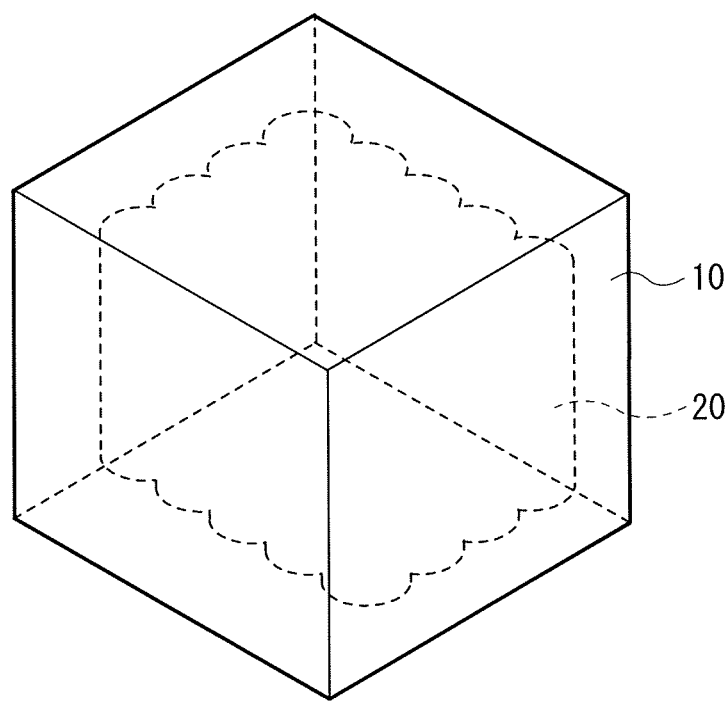
FIG. 1 is a perspective view of a configuration of a battery pack according to an embodiment of the present technology.

FIG. 1 illustrates a perspective configuration of the battery pack. The battery pack may include, for example, a housing 10 and a battery module 20 contained inside the housing 10, as illustrated in FIG. 1.

[Housing]

The housing 10 is mainly a member that contains and protects the battery module 20. A forming material of the housing 10 is not particularly limited, but may be, for example, one or more of metal materials, polymer materials, etc. Moreover, a three-dimensional shape of the housing 10 is not particularly limited, but may be, for example, a rectangular parallelepiped.

It is to be noted that the housing 10 may be, for example, openable and closable. For example, this may make it possible to detach the battery module 20 from inside of the housing 10 to outside on as-necessary basis.

[Battery Module]

The battery module 20 is mainly a battery element that generates electric power with use of a plurality of secondary batteries 21 (refer to FIGS. 2 and 3) to be described later. The kind of each of the secondary batteries is not particularly limited, but each of the secondary batteries may be, for example, a lithium-ion secondary battery.

A specific configuration of the battery module 20 is described later (refer to FIG. 2). In FIG. 1, an outer edge (contour) of the battery module 20 contained inside the housing 10 is indicated by a broken line.

<1-2. Configuration of Battery Module>

Next, description is given of the configuration of the battery module 20 illustrated in FIG. 1.

Figure 2:
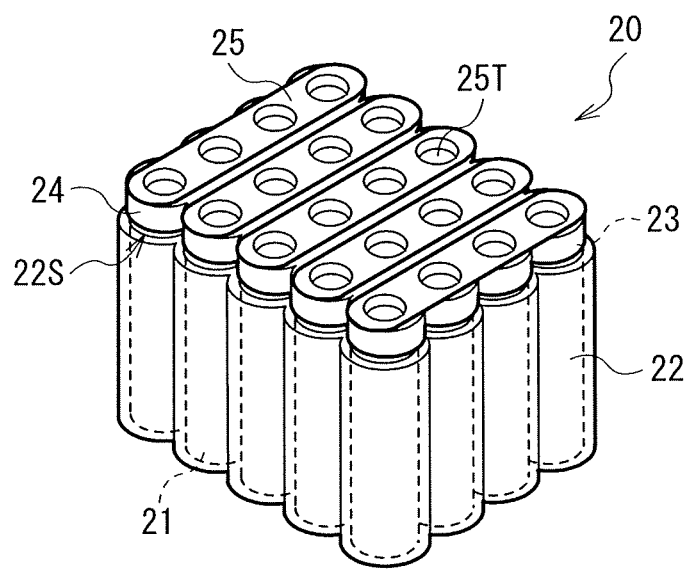
FIG. 2 is a perspective view of a configuration of a battery module illustrated in FIG. 1.
Figure 3:
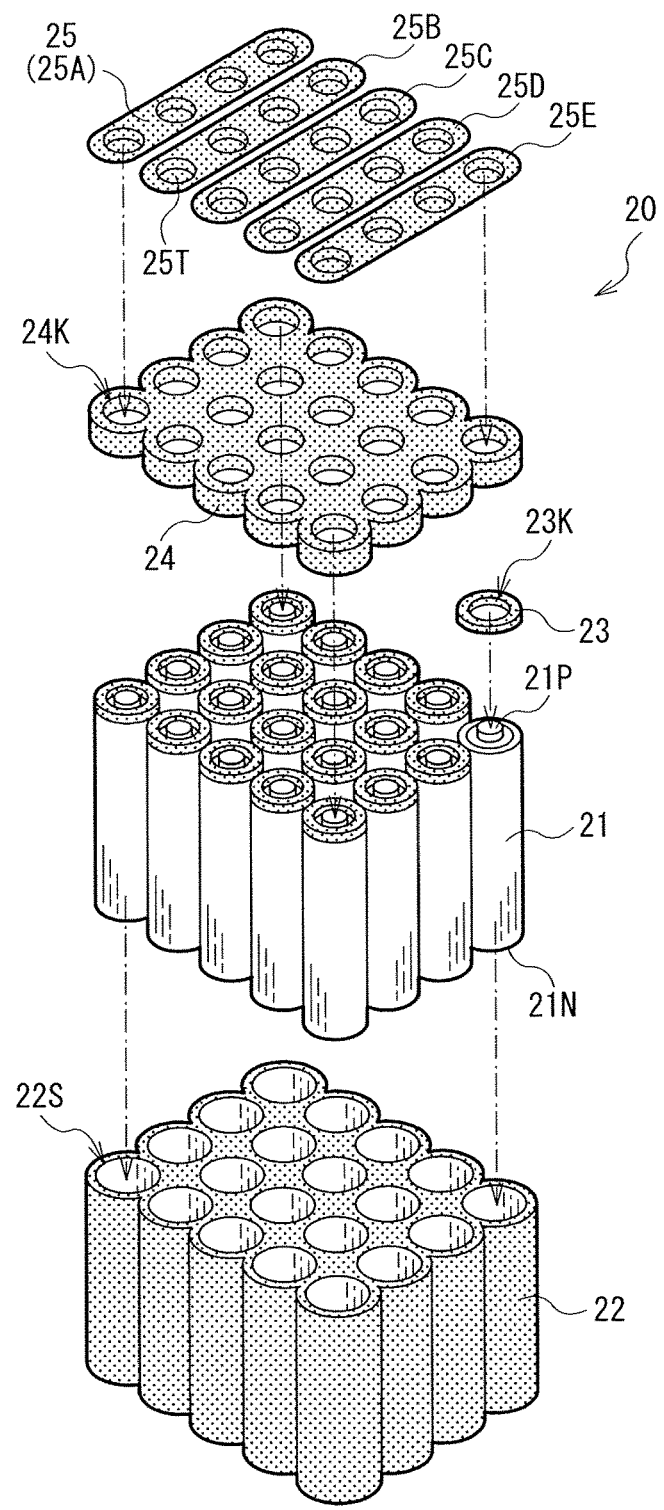
FIG. 3 is another perspective view of the configuration of the battery module illustrated in FIG. 1.

FIGS. 2 and 3 each illustrate a perspective configuration of the battery module 20. Note that FIG. 3 illustrates a state in which components are separated from one another for easy viewing of the components.

The battery module 20 may include, for example, the plurality of secondary batteries 21, a battery holder 22, a plurality of seals 23, a protective cover 24, and a wiring board 25, as illustrated in FIGS. 2 and 3. In FIG. 2, the battery holder 22, the seals 23, the protective cover 24, and the wiring board 25 are shaded.

[Secondary Battery]

Each of the secondary batteries 21 is a main part of the battery pack, and is a so-called power source. Herein, each of the secondary batteries 21 may be, for example, a so-called cylindrical type lithium-ion secondary battery, and may extend in a longitudinal direction (an upward-downward direction in FIG. 2).

Each of the secondary batteries 21 may include, for example, a protruded cathode terminal 21P provided at a first end in the longitudinal direction, and a non-protruded anode terminal 21N provided at a second end in the longitudinal direction.

The number of the secondary batteries 21 is not particularly limited, as long as the number of the secondary batteries 21 is two or more. FIGS. 2 and 3 each illustrate twenty secondary batteries 21 as an example for simplification of the drawings.

A specific configuration of each of the secondary batteries 21 (the cylindrical type lithium-ion secondary batteries) is described later (refer to FIG. 4).

[Battery Holder]

The battery holder 22 is a containing member that contains the plurality of secondary batteries 21. The battery holder 22 may include, for example, a plurality of containers 22S for containing of the plurality of secondary batteries 21, and each of the containers 22S may be, for example, a cylindrical depression extending in a direction similar to a direction where each of the secondary batteries 21 extends. In other words, each of the containers 22S may have a configuration in which a first end is closed and a second end is open.

As long as the secondary batteries 21 are contained in the battery holder 22 so as to expose one of the cathode terminal 21P and the anode terminal 21N, the orientation of the secondary batteries 21 is not particularly limited. Herein, for example, the secondary batteries 21 may be contained in the battery holder 22 so as to expose the cathode terminals 21P. In other words, for example, the secondary batteries 21 may be contained in the containers 22S so that the anode terminals 21N are disposed on the closed first end side and the cathode terminals 21P are disposed on the open second end side.

The number of the containers 22S are not particularly limited, as long as the number of the containers is two or more. Moreover, an array pattern of the plurality of containers 22S is not particularly limited. Herein, the number of the containers 22S may correspond to, for example, the foregoing number (twenty) of the secondary batteries 21. Further, the array pattern of the containers 22S may be, for example, a regular array (a grid array) having four columns and five rows.

The battery holder 22 is made of an appropriate forming material in terms of measures for safety. The forming material of the battery holder 22 is described later.

[Seal]

The plurality of seals 23 are interposition members between the plurality of secondary batteries 21 contained in the battery holder 22 and the protective cover 24, and mainly prevent entry of water and other substances into the plurality of secondary batteries 21.

Each of the seals 23 may have, for example, an opening 23K for exposure of the cathode terminal 21P. Accordingly, each of the seals 23 may be provided, for example, at the first end of the secondary battery 21 so as to expose the cathode terminal 21P from the opening 23K.

A planar shape of each of the seals 23 is not particularly limited, but may be, for example, a circular shape. Moreover, an opening shape of the opening 23K is not particularly limited, but may be, for example, a circular shape. Ringshaped seals 23 each having a circular planar shape and a circular opening shape are so-called O-rings or waterproofing rings.

The number of the seals 23 is not particularly limited. Herein, for example, one of the seals 23 may be provided to each of the secondary batteries 21; therefore, the number of the seals 23 may correspond to the foregoing number (twenty) of the secondary batteries 21. In FIG. 3, for easy understanding of a method of mounting the seals 23 on the secondary batteries 21, only one seal 23 of the twenty seals 23 is separated from the secondary batteries 21.

The seals 23 may be preferably made of an appropriate forming material in terms of measures for safety. The forming material of the seals 23 is described later.

[Protective Cover]

The protective cover 24 is mainly a protective member that protects the plurality of secondary batteries 21. The plurality of secondary batteries 21 contained in the battery holder 22 is covered with the protective cover 24.

The protective cover 24 may have, for example, a plurality of openings 24K for exposure of the plurality of cathode terminals 21P. Accordingly, for example, the plurality of secondary batteries 21 contained in the battery holder 22 may be covered with the protective cover 24 so as to expose the plurality of cathode terminals 21P from the plurality of openings 24K.

The number of openings 24K is not particularly limited, as long as the number of openings 24K is two or more. Moreover, an array pattern of the plurality of openings 24K is not particularly limited. Herein, for example, the number of the openings 24K may correspond to the foregoing number (twenty) of the secondary batteries 21, and the array pattern of the plurality of openings 24K may be an array pattern (grid array) corresponding to the foregoing array pattern of the plurality of containers 22S.

The protective cover 24 is made of an appropriate forming material in terms of measures for safety. The forming material of the protective cover 24 is described later.

[Wiring Board]

The wiring board 25 is mainly a wiring member that is coupled to the plurality of cathode terminals 21P of the plurality of secondary batteries 21.

The wiring board 25 may include, for example, a plurality of connection terminals 25T coupled to the plurality of cathode terminals 21P. The plurality of connection terminals 25T may be configured of, for example, portions protruded toward the protective cover 24 of the wiring board 25. Accordingly, for example, the plurality of connection terminals 25T of the wiring board 25 are coupled to the plurality of cathode terminals 21P exposed from the plurality of openings 24K.

The number of the connection terminals 25T is not particularly limited, as long as the number of the connection terminals 25T is two or more. Moreover, an array pattern of the plurality of connection terminals 25T is not particularly limited. Herein, for example, the number of the connection terminals 25T may correspond to the foregoing number (twenty) of the secondary batteries 21, and the array pattern of the plurality of connection terminals 25T may be an array pattern (grid array) corresponding to the foregoing array pattern of the containers 22S.

The wiring board 25 may be divided into, for example, two or more. Herein, the wiring board 25 may include five wiring portions 25A to 25E extending in a row direction of the foregoing regular array (having four columns and five rows). Each of the wiring portions 25A to 25E may have, for example, four connection terminals 25T arrayed in the row direction.

The wiring board 25 (the wiring portions 25A to 25E) may include, for example, one or more of metal materials such as nickel, iron, aluminum, copper, and tin. It is to be noted that the metal materials may be plated. More specifically, non-limiting examples of plated metal materials may include nickel-plated copper and tin-plated copper.

<1-3. Measures for Safety>

Next, description is given of measures for safety of the battery pack. In the battery pack, in terms of measured for safety, each of the specific components is made of an appropriate forming material, as described above.

[Heat Resistance Material]

More specifically, one or both of the battery holder 22 and the protective cover 24 include a heat resistance material. The "heat resistance material" is a generic name of a material that is resistant to overheating and resistant to combustion. The kind of the heat resistance material may include only one kind or two or more kinds.

More specifically, the heat resistance material is one or more of ceramic materials and heat-resistive polymer materials. The heat-resistive polymer materials are polymer materials having a heat resistance temperature (glass-transition temperature) of about 300° C. or higher.

The battery holder 22 includes the heat resistance material, which is resistant to fire spreading to the plurality of secondary batteries 21 even if some secondary batteries 21 of the plurality of secondary batteries 21 generate heat or generate fire due to an internal short circuit or any other reason.

More specifically, the plurality of secondary batteries 21 are closely packed and contained in the battery holder 22, as illustrated in FIGS. 2 and 3.

In a case where the battery holder 22 does not include the heat resistance material, if some secondary batteries 21 of the plurality of secondary batteries 21 generate heat or generate fire, the battery holder 22 is easily heated by the secondary batteries 21 generating heat or generating fire, which results in easily heating other secondary batteries 21 as well. In this case, if the other secondary batteries 21 are heated by the battery holder 22 to generate heat or generate fire, the plurality of secondary batteries 21 consequentially generate heat or generate fire, which easily causes fire spreading (thermal runaway) to the plurality of secondary batteries 21. In particular, if the secondary batteries 21 generate heat, the secondary batteries 21 generate an inflammable gas due to, for example, decomposition reaction of an electrolytic solution, which causes a tendency to easily spread fire to the plurality of secondary batteries 21.

In contrast, in a case where the battery holder 22 includes the heat resistance material, even if some secondary batteries 21 of the plurality of secondary batteries 21 generate heat or generate fire, the battery holder 22 is resistant to heating by the secondary batteries 21 generating heat or generating fire, which makes other secondary batteries 21 less prone to be heated. In this case, since the other secondary batteries 21 are less prone to generate heat or generate fire, the plurality of secondary batteries 21 are less prone to consequentially generate heat or generate fire. Accordingly, fire is less prone to be spread to the plurality of secondary batteries 21.

It is to be noted that even in a case where the protective cover 24 includes the heat resistance material, advantages in the case where the foregoing battery holder 22 includes the heat resistance material are obtained in a similar manner. More specifically, in the case where the protective cover 24 includes the heat resistance material, even if some secondary batteries 21 generate heat or generate fire, the protective cover 24 makes other secondary batteries 21 less prone to be heated; therefore, fire is less prone to be spread to the plurality of secondary batteries 21.

The kind of the ceramic materials is not particularly limited, but non-limiting examples of the ceramic materials may include ceramic fibers having resistance to heat of about 1000° C. or higher. The "ceramic fibers" are a generic name of artificial mineral fibers containing aluminum oxide (so-called alumina ($Al_2O_3$)) and silicon oxide (so-called silica ($SiO_2$)) as main components. More specific but non-limiting examples of the ceramic fibers may include a refractory ceramic fiber (RCF) and an alumina fiber (AF).

The RCF is an amorphous (glassy) alumina-silica fiber, and a refractory temperature of the RCF may be, for example, in a range from about 1000° C. to 1500° C. In the RCF, a content of alumina is substantially equal to a content of silica.

The AF is a crystalline alumina-silica fiber in which the content of alumina is larger than the content of silica, and a refractory temperature of the AF may be, for example, in a range from about 1300° C. to about 1700° C. In the AF, the content of alumina is larger than the content of silica. The content of alumina may be, for example, about 60% or more. The AF may be an alumina short fiber, an alumina long fiber, or both.

The kind of the heat-resistive polymer materials is not particularly limited, but non-limiting examples of the heat-resistive polymer materials may include polyimide and polyamide imide.

In particular, the heat resistance material may be preferably the ceramic material, and may be more preferably the ceramic fiber, which is lightweight and superior in properties such as flexibility, elasticity, and chemical resistance in addition to a sufficiently high heat resistance temperature. Moreover, the ceramic material is excluded from categories specified by Ordinance on Prevention of Hazards Due to Specified Chemical Substances, and is environmentally safe.

It is to be noted that in a case where both the battery holder 22 and the protective cover 24 include the heat resistance material, the heat resistance material included in the battery holder 22 and the heat resistance material included in the protective cover 24 may heat resistance materials of a same kind or heat resistance materials of different kinds.

In a case where one of the battery holder 22 and the protective cover 24 includes the heat resistance material, the other one that does not include the heat resistance material may include, for example, one or more of optional polymer materials. The kind of the polymer materials is not particularly limited, but non-limiting examples of the polymer materials may include polycarbonate (PC) and an ABS resin. The ABS resin is a copolymer (a synthetic resin) of acrylonitrile, butadiene, and styrene.

[Fire-Extinguishing Material]

It is to be noted that one or both of the plurality of seals 23 and the protective cover 24 may include a fire-extinguishing material. The "fire-extinguishing material" is a material containing a hydrate (a hydrate-containing material), and the hydrate-containing material is a generic name of a material that has ability to extinguish fire with use of water vapor (water of crystallization) during fire on the secondary batteries 21. The kind of the fire-extinguishing material may include only one kind or two or more kinds.

Note that in a case where the protective cover 24 includes the fire-extinguishing material, the protective cover 24 may include the heat resistance material or may not include the heat resistance material.

The seals 23 include the fire-extinguishing material, which is resistant to fire spreading to the plurality of secondary batteries 21 even if some secondary batteries 21 of the plurality of secondary batteries 21 generate fire due to an internal short circuit or any other reason.

More specifically, in a case where the seals 23 do not include the fire-extinguishing material, if some secondary batteries 21 of the plurality of secondary batteries 21 generate fire, fire on the secondary batteries 21 generating fire is not extinguished, and other secondary batteries 21 is easily combusted due to fire on the secondary batteries 21 generating fire. Alternatively, if some secondary batteries 21 generate fire, other secondary batteries 21 are heated through the battery holder 22, and the other secondary batteries 21 easily generate fire accordingly. In this case, the plurality of secondary batteries 21 consequentially generate heat or generate fire, which easily causes fire spreading (thermal runaway) to the plurality of secondary batteries 21.

In contrast, in a case where the seals 23 include the fire-extinguishing material, if some secondary batteries 21 of the plurality of secondary batteries 21 generate fire, the seals 23 are heated by fire on the secondary batteries 21 generating fire, thereby increasing a temperature of the fire-extinguishing material included in the seals 23. In this case, if the temperature of the fire-extinguishing material increases to a specific temperature or higher, the fire-extinguishing material generates water vapor, and the water vapor is used to extinguish fire on the secondary batteries 21 generating fire. Accordingly, the other secondary batteries 21 are less prone to be combusted or generate fire. Thus, the plurality of secondary batteries 21 are less prone to be combusted or generate fire consequentially, and fire is less prone to be spread to the plurality of secondary batteries 21.

It is to be noted that even in a case where the protective cover 24 includes the fire-extinguishing material, advantages in the case where the foregoing seals 23 include the fire-extinguishing material are obtained in a similar manner. More specifically, in the case where the protective cover 24 includes the fire-extinguishing material, even if some secondary batteries 21 generate fire, fire on the secondary batteries 21 is extinguished by the fire-extinguishing material included in the protective cover 24; therefore, fire is less prone to be spread to the plurality of secondary batteries 21.

The kind of the hydrate-containing material is not particularly limited, but non-limiting examples of the hydrate-containing material may include metal hydroxides that cause dissociation reaction of water of crystallization at a temperature equal to or higher than a specific temperature. More specific but non-limiting examples of the hydrate-containing material may include aluminum hydroxide ($Al(OH)_3$) and magnesium hydroxide ($Mg(OH)_2$). Since the metal hydroxides include a water molecule (water of crystallization) in a crystal, if a temperature of each of the metal hydroxides reaches the temperature equal to or higher than the specific temperature, separation (dissociation) of each of the metal hydroxide into a crystal and water of crystallization occurs. To given an example, in aluminum hydroxide, dissociation reaction of water of crystallization occurs at a temperature of about 200° C. or higher to cause dissociation into about 66% of a crystal of aluminum hydroxide and about 34% of water of crystallization.

In particular, since the metal hydroxides absorb heat during thermal decomposition (dissociation), use of a heatabsorbing phenomenon of the metal hydroxides also makes the secondary batteries 21 less prone to be combusted or generate fire. Moreover, the metal hydroxides are non-halogen-based inorganic flame-retardant fillers that do not generate a poisonous gas, which are environmentally safe.

It is to be noted that in a case where both the plurality of seals 23 and the protective cover 24 include the fire-extinguishing material, the fire-extinguishing material included in the plurality of seals 23 and the fire-extinguishing material included in the protective cover 24 may be fire-extinguishing materials of a same kind or fire-extinguishing materials of different kinds.

In this case, some of the plurality of seals 23 may include the fire-extinguishing material, or all of the plurality of seals 23 may include the fire-extinguishing material.

Moreover, each of the plurality of seals 23 and the protective cover 24 may include, for example, one or more of optional polymer materials in addition to the fire-extinguishing material. The kind of the polymer materials is not particularly limited, but non-limiting examples of the polymer materials may include polycarbonate and an ABS resin.

In a case where only one of the plurality of seals 23 and the protective cover 24 include the fire-extinguishing material, the other one that does not include the fire-extinguishing material may include, for example, one or more of the foregoing optical polymer materials.

[Combined Use of Heat Resistance Material and Fire-Extinguishing Material]

In particular, the fire-extinguishing material may be preferably used together with the heat resistance material, which achieves both the advantages derived from the foregoing heat resistance material and the advantages derived from the fire-extinguishing material. Accordingly, fire is still less prone to be spread to the plurality of secondary batteries 21.

<1-4. Configuration of Secondary Battery>

Next, description is given of the secondary battery 21.

Figure 4:
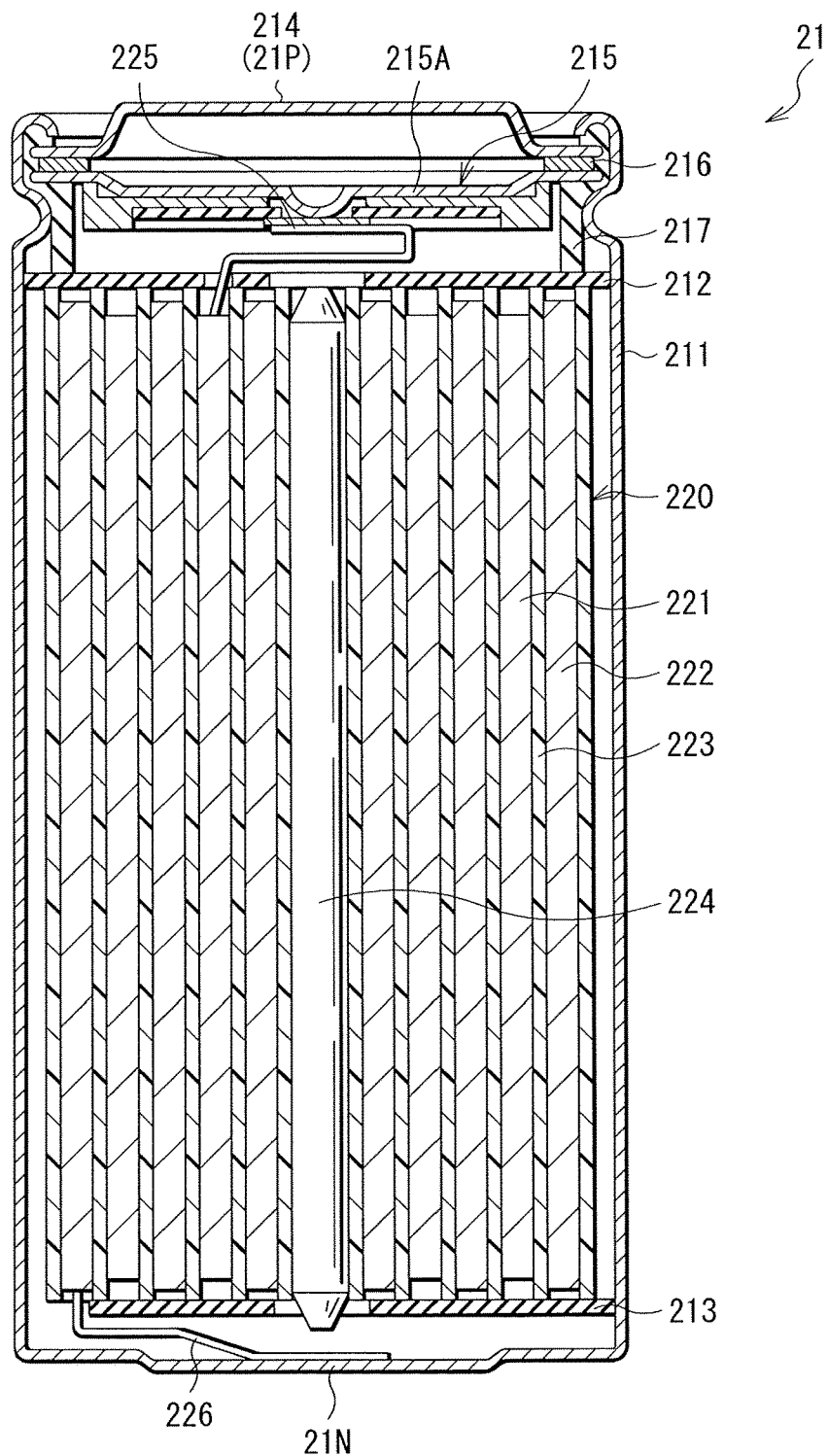
FIG. 4 is a cross-sectional view of a configuration of a secondary battery illustrated in FIG. 3.

FIG. 4 illustrates a cross-sectional configuration of one of the secondary batteries 21 illustrated in FIG. 3. The secondary battery 21 described here may be, for example, a cylindrical type lithium-ion secondary battery as described above. In the lithium-ion secondary battery, lithium is used as an electrode reactant, and a capacity of an anode is obtained with use of a lithium insertion phenomenon and a lithium extraction phenomenon.

[Whole Configuration]

More specifically, the secondary battery 21 may include, for example, a pair of insulating plates 212 and 213 and a spirally wound electrode body 220 inside a battery can 211, as illustrated in FIG. 3. The spirally wound electrode body 220 may be a spirally wound body formed as follows. A cathode 221 and an anode 222 may be stacked with a separator 223 in between, and thereafter the cathode 221, the anode 222, and the separator 223 may be spirally wound to form the spirally wound body. The spirally wound electrode body 220 may be impregnated with, for example, an electrolytic solution that is a liquid electrolyte.

The battery can 211 may have, for example, a hollow cylindrical structure in which one end of the battery can 211 is closed and the other end of the battery can 211 is open. The battery can 211 may be made of one or more of, for example, iron, aluminum, and an alloy thereof. The pair of insulating plates 212 and 213 may be so disposed as to extend perpendicularly to a spirally wound periphery surface of the spirally wound electrode body 220 and sandwich the spirally wound electrode body 220 in between.

At the open end of the battery can 211, a battery cover 214, a safety valve mechanism 215, and a positive temperature coefficient device (PTC device) 216 may be swaged with a gasket 17, by which the battery can 211 is hermetically sealed. The battery cover 214 may be made of, for example, a material similar to the material of the battery can 211, and may function as the foregoing cathode terminal 21P. Each of the safety valve mechanism 215 and the PTC device 216 may be provided on the inner side of the battery cover 214, and the safety valve mechanism 215 may be electrically coupled to the battery cover 214 via the PTC device 216. In the safety valve mechanism 215, when an internal pressure reaches a certain level or higher as a result of, for example, an internal short circuit or heating from outside, a disk plate 215A inverts. This cuts electric connection between the battery cover 214 and the spirally wound electrode body 220. In order to prevent abnormal heat generation resulting from a large current, resistance of the PTC device 216 increases as a temperature rises. The gasket 217 may be made of, for example, an insulating material.

For example, a center pin 224 may be inserted in a space provided at a center of the spirally wound electrode body 220. However, the secondary battery 21 may not include the center pin 224. A cathode lead 225 may be attached to the cathode 221, and may include, for example, one or more of conductive materials such as aluminum. An anode lead 226 may be attached to the anode 222, and may include, for example, one or more of conductive materials such as nickel. The anode lead 226 may be electrically coupled to the battery can 211; therefore, the battery can 211 may function as the foregoing anode terminal 21N.

[Cathode]

The cathode 221 may include, for example, a cathode current collector and a cathode active material layer provided on a single surface or both surfaces of the cathode current collector.

The cathode current collector may include, for example, one or more of conductive materials such as aluminum. The cathode active material layer may include, for example, a cathode active material that has ability to insert and extract lithium, and materials such as a cathode binder and a cathode conductor.

The cathode active material may include, for example, one or more of lithium-containing compounds. Non-limiting examples of the lithium-containing compounds may include a lithium-transition metal-containing composite oxide and a lithium transition metal-containing phosphate compound. The lithium-transition metal-containing composite oxide is a composite oxide including lithium and one or more transition metal elements as constituent elements, and the lithium-transition metal-containing phosphate compound is a phosphate compound including lithium and one or more transition metal elements as constituent elements. The kind of the transition metal elements is not particularly limited, but non-limiting examples of the transition metal elements may include nickel, cobalt, manganese, and iron.

The cathode binder may include, for example, one or more of synthetic rubbers, polymer materials, etc. Non-limiting examples of the synthetic rubbers may include a styrene-butadiene-based rubber, a fluorine-based rubber, and ethylene propylene diene. Non-limiting examples of the polymer material may include polyvinylidene fluoride and polyimide.

The cathode conductor may include, for example, one or more of carbon materials, etc. Non-limiting examples of the carbon materials may include graphite, carbon black, acetylene black, and Ketjen black.

[Anode]

The anode 222 may include, for example, an anode current collector and an anode active material layer provided on a single surface or both surfaces of the anode current collector.

The anode current collector may include, for example, one or more of conductive materials such as copper. The anode active material layer may include, for example, an anode active material that has ability to insert and extract lithium, and materials such as an anode binder and an anode conductor.

The anode active material may include, for example, one or more of carbon materials, metal-based materials, etc. Non-limiting examples of the carbon materials may include graphitizable carbon, nongraphitizable carbon, and graphite. The metal-based material may be, for example, a generic name of a material including one or more of metal elements and metalloid elements as constituent elements. The metal-based material may be any of a simple substance, an alloy, or a compound, may be two or more thereof, or may have one or more phases thereof at least in part. The respective kinds of the metal elements and metalloid elements are not particularly limited, but non-limiting examples of the metal elements and the metalloid elements may include magnesium, boron, aluminum, gallium, indium, silicon, germanium, tin, lead, bismuth, cadmium, silver, zinc, hafnium, zirconium, yttrium, palladium, and platinum.

Details of the anode binder may be, for example, similar to those of the foregoing cathode binder, and details of the anode conductor may be, for example, similar to those of the foregoing cathode conductor.

In the secondary battery 21, in order to prevent lithium metal from being unintentionally precipitated on a surface of the anode 222 in the middle of charge, for example, electrochemical equivalent of the anode active material that has ability to insert and extract lithium is set to be larger than electrochemical equivalent of the cathode 221.

[Separator]

The separator 223 is provided between the cathode 221 and the anode 222. The separator 223 passes lithium ions therethrough while preventing a current short circuit that results from contact between the cathode 221 and the anode 222. The separator 223 may include, for example, one or more of porous films such as porous films of a synthetic resin and ceramics. Non-limiting examples of the synthetic resin may include polytetrafluoroethylene, polypropylene, and polyethylene.

[Electrolytic Solution]

The electrolyte solution may include, for example, a nonaqueous solvent and an electrolyte salt. The nonaqueous solvent may include, for example, one or more of cyclic carbonate esters, chain carbonate esters, etc. Non-limiting examples of the cyclic carbonate esters may include ethylene carbonate and propylene carbonate, and non-limiting examples of the chain carbonate esters may include dimethyl carbonate, diethyl carbonate, and ethylmethyl carbonate. The electrolyte salt may include, for example, one or more of lithium salts, etc., and non-limiting examples of the lithium salts may include lithium hexafluorophosphate ($LiPF_6$).

<1-5. Operation>

Next, description is given of operation of the battery pack.

When the battery pack is used, for example, charge-discharge reaction proceeds in the plurality of secondary batteries 21, as described below. In other words, when each of the secondary batteries 21 is charged, lithium ions are extracted from the cathode 221 and the extracted lithium ions are inserted in the anode 222 through the electrolytic solution. In contrast, when each of the secondary batteries 21 is discharged, lithium ions are extracted from the anode 222 and the extracted lithium ions are inserted in the cathode 221 through the electrolytic solution.

<1-6. Action and Effects>

According to the battery pack of the present embodiment, one or both of the battery holder 22 and the protective cover 24 include the heat resistance material. In this case, as described above, even if some secondary batteries 21 of the plurality of secondary batteries 21 generate heat or generate fire, the one or both of the battery holder 22 and the protective cover 24 make other secondary batteries 21 less prone to be heated; therefore, the other secondary batteries 21 is less prone to generate heat or generate fire. Accordingly, fire is less prone to be spread to the plurality of secondary batteries 21, which makes it possible to improve safety.

In this case, in particular, if the heat resistance material includes the ceramic material (ceramic fiber), the other secondary batteries 21 is still less prone to be heated. This makes it possible to achieve a higher effect.

Moreover, in the case where one or both of the plurality of seals 23 and the protective cover 24 include the fire-extinguishing material (hydrate-containing material), even if some secondary batteries 21 of the plurality of secondary batteries 21 generate fire, fire on the secondary batteries 21 generating fire is extinguished by the fire-extinguishing material, as described above. This makes other secondary batteries 21 less prone to generate fire. Accordingly, fire is less prone to be spread to the plurality of secondary batteries 21, which makes it possible to achieve a higher effect.

In this case, in particular, if the fire-extinguishing material includes the metal hydroxide, fire on some secondary batteries 21 is extinguished with use of water of crystallization contained in the metal hydroxide, which makes it possible to achieve a higher effect.

<2. Battery Pack (Second Embodiment)>

Next, description is given of a battery pack according to a second embodiment of the present technology. In the following description, the components of the battery pack according to the first embodiment that have been already described are used where appropriate.

The battery pack according to the present embodiment has a configuration similar to that of the battery pack according to the first embodiment, except that a different order of priority is put on the heat resistance material and the fire-extinguishing material that are used for measures for safety.

<2-1. Measures for Safety>

More specifically, one or both of the plurality of seals 23 and the protective cover 24 include the fire-extinguishing material. Details of the kind of the fire-extinguishing material, advantages derived from the fire-extinguishing material, etc. are as described in the first embodiment. In other words, even if some secondary batteries 21 of the plurality of secondary batteries 21 generate fire, fire on the secondary batteries 21 generating fire is extinguished by the fire-extinguishing material; therefore, fire is less prone to be spread to the plurality of secondary batteries 21.

It is to be noted that one or both of the battery holder 22 and the protective cover 24 may include the heat resistance material. Details of the kind of the heat resistance material, advantages derived from the heat resistance material, etc. are as described in the first embodiment. In other words, even if some secondary batteries 21 of the plurality of secondary batteries 21 generate heat or generate fire, other secondary batteries 21 are less prone to be heated. Accordingly, the other secondary batteries 21 are less prone to generate heat or generate fire; therefore, fire is less prone to be spread to the plurality of secondary batteries 21.

In particular, the heat resistance material may be preferably used together with the fire-extinguishing material. Since both the foregoing advantages derived from the fire-extinguishing material and the foregoing advantages derived from the heat resistance material are achievable, fire is still less prone to be spread to the plurality of secondary batteries 21.

<2-2. Action and Effects>

According to the battery pack of the present embodiment, one or both of the plurality of seals 23 and the protective cover 24 include the fire-extinguishing material. In this case, even if some secondary batteries 21 of the plurality of secondary batteries 21 generate fire, fire on the secondary batteries 21 generating fire is extinguished by the fire-extinguishing material, as described above. This makes other secondary batteries 21 less prone to generate fire. Accordingly, fire is less prone to be spread to the plurality of secondary batteries 21, which makes it possible to improve safety.

Moreover, in a case where one or both of the battery holder 22 and the protective cover 24 include the heat resistance material, even if some secondary batteries 21 of the plurality of secondary batteries 21 generate heat or generate fire, other secondary batteries 21 are less prone to be heated, as described above; therefore, the other secondary batteries 21 are less prone to generate heat or generate fire. Accordingly, fire is less prone to be spread to the plurality of secondary batteries 21, which makes it possible to further improve safety.

Action and effects other than those described above are similar to the action and the effects in the first embodiment.

<3. Modification Examples>

The configuration of the battery pack may be modified as appropriate.

More specifically, for example, the number of the secondary batteries 21 contained in the battery holder 22 is not particularly limited as described above, and may be freely changed. Accordingly, for example, the number of the containers 22S, the number of the seals 23, the number of the openings 24K, and the number of the connection terminals 25T may be freely set depending on the number of the secondary batteries 21.

<4. Applications of Battery Pack>

Next, description is given of application examples (applications) of the foregoing battery pack.

Applications of the battery pack are not particularly limited, as long as the battery pack is applied to, for example, a machine, a device, an instrument, an apparatus, and a system (a collective entity of, for example, a plurality of devices) that are able to use the secondary battery as a driving power source, an electric power storage source for electric power accumulation, or any other source. The battery pack used as the power source may be a main power source or an auxiliary power source. The main power source is a power source used preferentially irrespective of the presence or absence of other power sources. For example, the auxiliary power source may be a power source used instead of the main power source or may be used being switched from the main power source. In a case where the battery pack is used as the auxiliary power source, the kind of the main power source is not limited to the battery pack.

<4-1. Various Applications such as Electronic Apparatus>

Examples of the applications of the battery pack may include electronic apparatuses (including portable electronic apparatuses) such as a video camcorder, a digital still camera, a mobile phone, a notebook personal computer, a cordless phone, a headphone stereo, a portable radio, a portable television, and a portable information terminal. Further examples thereof may include: a mobile lifestyle appliance such as an electric shaver; a storage device such as a backup power source and a memory card; an electric power tool such as an electric drill and an electric saw; a medical electronic apparatus such as a pacemaker and a hearing aid; an electric vehicle such as an electric automobile (including a hybrid automobile); and an electric power storage system such as a home battery system for accumulation of electric power for, for example, emergency. It goes without saying that the battery pack may be employed for an application other than the applications mentioned above.

In particular, the battery pack is effectively applicable to, for example, the electric vehicle, the electric power storage system, the electric power tool, and the electronic apparatus, and is more effectively applied to the electric power tool. In these applications, superior battery characteristics are demanded, and using the battery pack according to any of the embodiments of the present technology makes it possible to effectively improve performance.

It is to be noted that the electric vehicle is a vehicle that operates (runs) using the battery pack as a driving power source, and may be an automobile (such as a hybrid automobile) that includes together a drive source other than the battery pack, as described above. The electric power storage system is a system that uses the battery pack as an electric power storage source. For example, in a home electric power storage system, electric power is accumulated in the battery pack that is the electric power storage source, which makes it possible to use, for example, home electric products with use of the accumulated electric power. The electric power tool is a tool in which a movable section (such as a drill) is allowed to be moved with use of the battery pack as a driving power source. The electronic apparatus is an apparatus that executes various functions with use of the battery pack as a driving power source (an electric power supply source).

Hereinafter, specific description is given of some application examples of the battery pack. It is to be noted that configurations of the respective application examples described below are mere examples, and may be changed as appropriate.

<4-2. Electric Power Tool>

Figure 5:
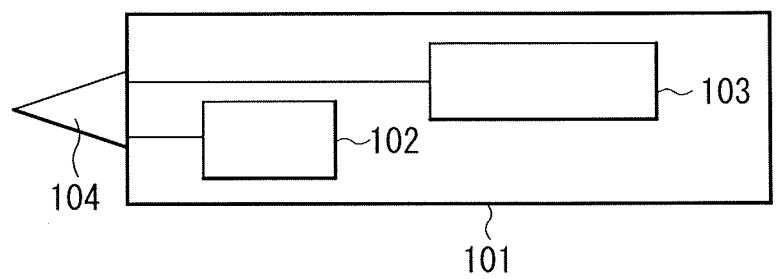
FIG. 5 is a block diagram illustrating a configuration of an application example (an electric power tool) of the battery pack.

FIG. 5 illustrates a block configuration of the electric power tool.

The electric power tool described here may be, for example, an electric drill. The electric power tool may include, for example, a controller 102 and a power source 103 inside a tool body 101. A drill section 104 that is a movable section may be attached to the tool body 101 in an operable (rotatable) manner, for example.

The tool body 101 may include, for example, one or more of metal materials, polymer materials, etc. The controller 102 controls an operation of the entire electric power tool (including a used state of the power source 103). The controller 102 may include, for example, a central processing unit (CPU). The power source 103 includes one or more battery packs. The controller 102 allows electric power to be supplied from the power source 103 to the drill section 104 in accordance with an operation by an operation switch.

EXAMPLES

Next, description is given of examples of the present technology. It is to be noted that description is given in the following order.
1. Evaluation of Heat resistance material
2. Evaluation of Fire-extinguishing Material <1. Evaluation of Heat Resistance Material>

First, battery packs using a heat resistance material were evaluated.

Experimental Examples 1-1 to 1-7

The battery packs illustrated in FIGS. 1 to 3 were fabricated by the following procedure.

The battery packs each were fabricated using the secondary batteries 21, the battery holder 22, the plurality of seals 23, the protective cover 25, and the wiring board 25 (the wiring portions 25A to 25E). The secondary batteries were twenty cylindrical type lithium-ion secondary batteries. The battery holder 22 was made of a heat resistance material (a ceramic material). The plurality of seals 23 were twenty waterproofing rings made of polycarbonate (PC). The protective cover 25 was made of a heat resistance material (a ceramic material). The wiring board 25 was made of tin-plated copper. The array pattern of twenty containers 22S was a grid array having four rows and five columns.

As the ceramic material, a refractory ceramic fiber (RCF) and an alumina fiber (AF) that were ceramic fibers were used. It is to be noted that for comparison, a polymer material (PC) was used in place of the ceramic material. Details of respective forming materials of the battery holder 22 and the protective cover 24 are as illustrated in Table 1. In Table 1, a "heat resistance" column indicates whether the forming material of each of the battery holder 22 and the protective cover 24 had heat resistance, that is, included the heat resistance material.

The battery packs each were assembled as follows. The twenty secondary batteries 21 each including the cathode terminal 21P to which the seal 23 was attached were contained in the battery holder 22, and thereafter, the protective cover 24 and the wiring board 25 were mounted on the battery holder 22 so that these secondary batteries 21 were covered with the protective cover 24 and the wiring board 25.

Each of the secondary batteries 21 was fabricated by the following procedure.

The cathode 221 was fabricated as follows. Both surfaces of the cathode current collector (a strip-shaped aluminum foil having a thickness of 15 μm) were covered with slurry to form the cathode active material layer, and thereafter, the cathode active material layer was compression-molded. The slurry was prepared as follows. First, 94 parts by mass of a cathode active material ($LiCoO_2$), 3 parts by mass of a cathode binder (polyvinylidene fluoride), and 3 parts by mass of a cathode conductor (graphite) were mixed to obtain a mixture. Subsequently, the mixture was dissolved or dispersed in an organic solvent (N-methyl-2-pyrrolidone) to prepare the slurry.

The anode 222 was fabricated as follows. Both surfaces of the anode current collector (a copper foil having a thickness of 15 μm) were covered with slurry to form the anode active material layer, and thereafter, the anode active material layer was compression-molded. The slurry was prepared as follows. First, 95 parts by mass of an anode active material (graphite), 3 parts by mass of an anode binder (polyvinylidene fluoride), and 2 parts by mass of an anode conductor (carbon black) were mixed to obtain a mixture. Subsequently, the mixture was dissolved or dispersed in an organic solvent (N-methyl-2-pyrrolidone) to prepare the slurry.

An electrolytic solution was prepared as follows. An electrolyte salt ($LiPF_6$) was added into a solvent (ethylene carbonate, ethylmethyl carbonate, and dimethyl carbonate), and thereafter the solvent was stirred. In this case, a mixture ratio (weight ratio) of the solvent was ethylene carbonate: ethylmethyl carbonate:dimethyl carbonate=20:20:60, and the content of the electrolyte salt was 1 mol/kg with respect to the solvent.

Each of the secondary batteries 21 was assembled as follows. First, the cathode lead 225 made of aluminum was attached to the cathode current collector by welding, and the anode lead 226 made of nickel was attached to the anode current collector by welding. Subsequently, the cathode 221 and the anode 222 were stacked with the separator 223 (a microporous polyethylene film having a thickness of 16 μm) in between, and the cathode 221 and the anode 222 were spirally wound to fabricate a spirally wound body. Thereafter, a winding end portion of the spirally wound body was fixed with use of an adhesive tape to fabricate the spirally wound electrode body 220. Subsequently, the center pin 224 was inserted in a space provided at the center of the spirally wound electrode body 220. Subsequently, the spirally wound electrode body 220 was sandwiched between the pair of insulating plates 212 and 213, and was contained inside the battery can 211 made of nickel-plated iron. In this case, an end tip of the cathode lead 225 was attached to the safety valve mechanism 215 by welding, and an end tip of the anode lead 26 was attached to the battery can 211 by welding. Subsequently, the electrolytic solution was injected inside the battery can 211 by a decompression method, and the spirally wound electrode body 220 was impregnated with the electrolytic solution. Lastly, the battery cover 214, the PTC device 216, and the safety valve mechanism 215 were swaged with the gasket 217 at the open end of the battery can 211.

Thus, the spirally wound electrode body 220 and other components were sealed inside the battery can 211, and each of the secondary batteries 21 that were the cylindrical type lithium-ion secondary batteries was completed.

Combustion states of the battery packs were examined to evaluate safety of the battery packs, and results illustrated in Table 1 were thereby obtained.

The combustion states of the battery packs were examined as follows. A nail was inserted into one secondary battery 21 of the twenty secondary batteries 21 contained in the battery holder 22 to intentionally cause the one secondary batteries 21 to generate fire. In this case, the nail was inserted into an upper surface of the secondary battery 21 charged to a completely-charged state, and a depth of insertion of the nail was a depth corresponding to substantially a half of a length of the secondary battery 21. Thereafter, whether a phenomenon (fire spreading) that the other plurality of secondary batteries 21 generated fire consequentially resulting from fire generation of the one secondary battery 21 occurred was visually confirmed.

As a result, in determination whether fire spreading occurred, a case where the other plurality of secondary batteries 21 consequentially generated fire is determined as "Occurred". In contrast, in determination whether fire spreading occurred, a case where the other plurality of secondary batteries 21 did not generate fire is determined as "Not Occurred".

TABLE 1

| Experimental Example | Battery Holder | | Protective Cover | | Fire Spreading |
|---|---|---|---|---|---|
| | Forming material | Heat Resistance | Forming material | Heat Resistance | |
| 1-1 | RCF | Presence | PC | Absence | Not Occurred |
| 1-2 | AF | Presence | PC | Absence | Not Occurred |
| 1-3 | PC | Absence | RCF | Presence | Not Occurred |
| 1-4 | PC | Absence | AF | Presence | Not Occurred |
| 1-5 | RCF | Presence | RCF | Presence | Not Occurred |
| 1-6 | AF | Presence | AF | Presence | Not Occurred |
| 1-7 | PC | Absence | PC | Absence | Occurred |

In a case where one or both of the battery holder 22 and the protective cover 24 did not include the heat resistance material (an experimental example 1-7), the other plurality of secondary batteries 21 generated fire consequentially resulting from fire generation of the one secondary battery 21, which caused fire spreading.

In contrast, in a case where one or both of the battery holder 22 and the protective cover 24 included the heat resistance material (experimental examples 1-1 to 1-6), the other plurality of secondary batteries 21 did not generate fire consequentially resulting from fire generation of the one secondary battery 21, which did not cause fire spreading.

The seals 23 including the fire-extinguishing material (the metal hydroxide) were formed as follows. The polymer material (polycarbonate) and the fire-extinguishing material (the metal hydroxide) were mixed to form a mixture, and thereafter the mixture was molded with use of a mold. The protective cover 24 including the fire-extinguishing material (the metal hydroxide) was also formed through molding a mixture with use of a mold by a similar procedure.

Combustion states of the battery packs were examined to evaluate safety of the battery packs, and results illustrated in Table 2 were obtained.

The combustion states of the battery packs were examined as follows. One of the twenty secondary batteries 21 intentionally generated fire by the foregoing procedure, and occurrence of fire spreading was visually confirmed.

As a result, in determination whether fire spreading occurred, a case where the other plurality of secondary batteries 21 generated fire consequentially within several seconds after fire generation of the one secondary battery 21 was determined as "Occurred". In contrast, in determination whether fire spreading occurred, a case where the other plurality of secondary batteries 21 did not generate fire consequentially even after 30 seconds from fire generation of the one secondary battery 21 was determined as "Not Occurred".

TABLE 2

| Experimental Example | Seal | | Protective Cover | | Fire Spreading |
|---|---|---|---|---|---|
| | Forming material | Fire-extinguishing Properties | Forming material | Fire-extinguishing Properties | |
| 2-1 | PC + AH | Presence | PC | Absence | Not Occurred |
| 2-2 | PC + MH | Presence | PC | Absence | Not Occurred |
| 2-3 | PC | Absence | PC + AH | Presence | Not Occurred |
| 2-4 | PC | Absence | PC + MH | Presence | Not Occurred |
| 2-5 | PC + AH | Presence | PC + AH | Presence | Not Occurred |
| 2-6 | PC + MH | Presence | PC + MH | Presence | Not Occurred |
| 2-7 | PC | Absence | PC | Absence | Occurred |

<2. Evaluation of Fire-Extinguishing Material>

Next, the battery packs using a fire-extinguishing material were evaluated.

Experimental Examples 2-1 to 2-7

The battery packs were fabricated by a similar procedure, except that the configuration was changed as follows, as illustrated in Table 2.

The battery packs were fabricated using the battery holder 22, the plurality of seals 23, and the protective cover 24. The battery holder 22 was made of polycarbonate. The plurality of seals 23 were waterproofing rings made of a polymer material (polycarbonate) and a fire-extinguishing material (a metal hydroxide). The protective cover 24 was made of a polymer material (polycarbonate) and a fire-extinguishing material (a metal hydroxide).

As the metal hydroxide, one or both of aluminum hydroxide (AH) and magnesium hydroxide (MH) were used. It is to be noted that for comparison, the metal hydroxide was not used. Details of the respective forming materials of the seals 23 and the protective cover 24 are as illustrated in Table 2. In Table 2, a "fire-extinguishing properties" column indicates whether the forming material of each of the seals 23 and the protective cover 24 had fire-extinguishing properties, that is, included the fire-extinguishing material.

In a case where one or both of the seals 23 and the protective cover 24 did not include the fire-extinguishing material (an experimental example 2-7), the one secondary battery 21 generated fire, and the other plurality of secondary batteries 21 generated fire consequentially and immediately after fire generation of the one secondary battery 21, which caused fire spreading.

In contrast, in a case where one or both of the seals 23 and the protective cover 24 included the fire-extinguishing material (experimental examples 2-1 to 2-6), even though the one secondary battery 21 generated fire, the other plurality of secondary batteries 21 did not generate fire consequentially and immediately after fire generation of the one secondary battery 21, which did not cause fire spreading.

It is to be noted that although specific experimental results are not shown herein, as can be seen from the results in Table 1 in a case where the heat resistance material was used and the results in Table 2 in a case where the fire-extinguishing material was used, it is expected that even in a case where both the heat resistance material and the fire-extinguishing material are used, a similar tendency is achievable. In other words, even in the case where both the heat resistance material and the fire-extinguishing material are used, fire spreading is less prone to occur.

As can be seen from the results in Tables 1 and 2, in the case where one or both of the battery holder 22 and the protective cover 24 included the heat resistance material, fire was less prone to be spread to the plurality of secondary batteries 21. Moreover, in the case where one or both of the plurality of seals 23 and the protective cover 24 included the fire-extinguishing material, fire was less prone to be spread to the plurality of secondary batteries 21. Accordingly, safety of the battery pack was improved.

Although the present technology has been described above referring to some embodiments and examples, the present technology is not limited thereto, and may be modified in a variety of ways.

More specifically, the description has been given with reference to an example in which the lithium-ion secondary batteries in which the capacity of the anode is obtained with use of the lithium insertion phenomenon and the lithium extraction phenomenon are used as the secondary batteries mounted in the battery pack. However, the secondary batteries are not limited thereto. The secondary batteries may be, for example, lithium metal secondary batteries in which a capacity of an anode is obtained with use of a lithium precipitation phenomenon and a lithium dissolution phenomenon. Moreover, the secondary batteries may be secondary batteries in which a capacity of an anode active material that has ability to insert and extract lithium is set smaller than a capacity of a cathode to obtain a capacity of an anode by the sum of a capacity derived from the lithium insertion phenomenon and the lithium extraction phenomenon and a capacity derived from the lithium precipitation phenomenon and the lithium dissolution phenomenon.

Further, the description has been given with reference to an example in which the secondary batteries are the lithium-ion secondary batteries using lithium as the electrode reactant; however, the electrode reactant is not limited to lithium. The electrode reactant may be any of other Group 1 elements such as sodium and potassium in the long form of the periodic table of the elements, Group 2 elements such as magnesium and calcium in the long form of the periodic table of the elements, and other light-metals such as aluminum. Furthermore, the electrode reactant may be an alloy including one or more of the foregoing elements.

Note that the effects described in the present specification are illustrative and non-limiting. The present technology may have effects other than those described in the present specification.

It is to be noted that the present technology may have the following configurations.

(1)

A battery pack, including:

a plurality of secondary batteries each including a plurality of terminals;

a containing member that contains the plurality of secondary batteries to expose the plurality of terminals;

a protective member that includes a plurality of openings and with which the plurality of secondary batteries contained in the containing member are covered to expose the plurality of terminals from the plurality of openings; and a wiring member coupled to the plurality of terminals exposed from the plurality of openings, in which one or both of the containing member and the protective member include one or both of a ceramic material and a polymer material having a heat resistance temperature of 300° C. or higher.

(2)

The battery pack according to (1), in which the ceramic material includes a ceramic fiber.

(3)

The battery pack according to (1) or (2), further including a plurality of interposition members interposed between the plurality of secondary batteries contained in the containing member and the protective member, and each including an opening for exposure of the terminals, in which one or both of the protective member and the plurality of interposition members include a hydrate-containing material.

(4)

The battery pack according to (3), in which the hydrate-containing material includes a metal hydroxide, and the metal hydroxide includes one or both of aluminum hydroxide and magnesium hydroxide.

(5)

The battery pack according to any one of (1) to (4), in which the secondary batteries are lithium-ion secondary batteries.

(6)

A battery pack, including:

a plurality of secondary batteries each including a plurality of terminals;

a containing member that contains the plurality of secondary batteries to expose the plurality of terminals;

a protective member that includes a plurality of openings and with which the plurality of secondary batteries contained in the containing member are covered to expose the plurality of terminals from the plurality of openings; and a wiring member coupled to the plurality of terminals exposed from the plurality of openings, in which the protective member includes a hydrate-containing material.

(7)

The battery pack according to (6), in which the hydrate-containing material includes a metal hydroxide, and the metal hydroxide includes one or both of aluminum hydroxide and magnesium hydroxide.

(8)

The battery pack according to (6) or (7), further including a plurality of interposition members interposed between the plurality of secondary batteries contained in the containing member and the protective member, and each including an opening for exposure of the terminal, in which the plurality of interposition members include the hydrate-containing material.

(9)

The battery pack according to any one of (6) to (8), in which one or both of the containing member and the protective member include one or both of a ceramic material and a polymer material having a heat resistance temperature of 300° C. or higher.

(10)

The battery pack according to (9), in which the ceramic material includes a ceramic fiber.

(11)

The battery pack according to any one of (6) to (10), in which the secondary batteries are lithium-ion secondary batteries.

(12)

An electric power tool including:

the battery pack according to any one of (1) to (5); and a movable section that is supplied with electric power from the battery pack.

(13)

An electric power tool including:
the battery pack according to any one of (6) to (11); and
a movable section that is supplied with electric power from the battery pack.

(14)

An electronic apparatus including the battery pack according to any one of (1) to (5) as an electric power supply source.

(15)

An electronic apparatus including the battery pack according to any one of (6) to (11) as an electric power supply source.

It should be understood by those skilled in the art that various modifications, combinations, sub-combinations and alterations may occur depending on design requirements and other factors insofar as they are within the scope of the appended claims or the equivalents thereof.

What is claimed is:

1. A battery pack, comprising:
   a plurality of secondary batteries each secondary battery including a plurality of terminals;
   a containing member that contains the plurality of secondary batteries to expose the plurality of terminals;
   a protective member that includes a plurality of openings and with which the plurality of secondary batteries contained in the containing member are covered to expose the plurality of terminals from the plurality of openings; and
   a wiring member coupled to the plurality of terminals exposed from the plurality of openings,
   wherein one or both of the containing member and the protective member include one or both of a ceramic material and a polymer material having a heat resistance temperature of 300° C. or higher.

2. The battery pack according to claim 1, wherein the ceramic material includes a ceramic fiber.

3. The battery pack according to claim 1, further comprising a plurality of interposition members interposed between the plurality of secondary batteries contained in the containing member and the protective member, and each interposition member and each protective member including an opening for exposure of each terminal of the plurality of terminals,
   wherein one or both of the protective member and the plurality of interposition members include a hydrate-containing material.

4. The battery pack according to claim 3, wherein
   the hydrate-containing material includes a metal hydroxide, and
   the metal hydroxide includes one or both of aluminum hydroxide and magnesium hydroxide.

5. The battery pack according to claim 1, wherein the plurality of secondary batteries are lithium-ion secondary batteries.

6. A battery pack, comprising:
   a plurality of secondary batteries each secondary battery including a plurality of terminals;
   a containing member that contains the plurality of secondary batteries to expose the plurality of terminals;
   a protective member that includes a plurality of openings and with which the plurality of secondary batteries contained in the containing member are covered to expose the plurality of terminals from the plurality of openings; and
   a wiring member coupled to the plurality of terminals exposed from the plurality of openings,
   wherein the protective member includes a hydrate-containing material.

7. The battery pack according to claim 6, wherein
   the hydrate-containing material includes a metal hydroxide, and
   the metal hydroxide includes one or both of aluminum hydroxide and magnesium hydroxide.

8. The battery pack according to claim 6, further comprising a plurality of interposition members interposed between the plurality of secondary batteries contained in the containing member and the protective member, and each interposition member and each protective member including an opening for exposure of each terminal of the plurality of terminals,
   wherein the plurality of interposition members include the hydrate-containing material.

9. The battery pack according to claim 6, wherein one or both of the containing member and the protective member include one or both of a ceramic material and a polymer material having a heat resistance temperature of 300° C. or higher.

10. The battery pack according to claim 9, wherein the ceramic material includes a ceramic fiber.

11. The battery pack according to claim 6, wherein the plurality of secondary batteries are lithium-ion secondary batteries.

12. An electric power tool, comprising:
    a battery pack; and
    a movable section that is supplied with electric power from the battery pack,
    the battery pack including
    a plurality of secondary batteries each secondary battery including a plurality of terminals,
    a containing member that contains the plurality of secondary batteries to expose the plurality of terminals,
    a protective member that includes a plurality of openings and with which the plurality of secondary batteries contained in the containing member are covered to expose the plurality of terminals from the plurality of openings, and
    a wiring member coupled to the plurality of terminals exposed from the plurality of openings,
    wherein one or both of the containing member and the protective member include one or both of a ceramic material and a polymer material having a heat resistance temperature of 300° C. or higher.

13. An electric power tool, comprising:
    a battery pack; and
    a movable section that is supplied with electric power from the battery pack,
    the battery pack including
    a plurality of secondary batteries each secondary battery including a plurality of terminals,
    a containing member that contains the plurality of secondary batteries to expose the plurality of terminals,
    a protective member that includes a plurality of openings and with which the plurality of secondary batteries contained in the containing member are covered to expose the plurality of terminals from the plurality of openings, and
    a wiring member coupled to the plurality of terminals exposed from the plurality of openings,
    wherein the protective member includes a hydrate-containing material.

14. An electronic apparatus comprising a battery pack as an electric power supply source, the battery pack including a plurality of secondary batteries each secondary battery including a plurality of terminals, a containing member that contains the plurality of secondary batteries to expose the plurality of terminals, a protective member that includes a plurality of openings and with which the plurality of secondary batteries contained in the containing member are covered to expose the plurality of terminals from the plurality of openings, and a wiring member coupled to the plurality of terminals exposed from the plurality of openings, wherein one or both of the containing member and the protective member include one or both of a ceramic material and a polymer material having a heat resistance temperature of 300° C. or higher.

15. An electronic apparatus comprising a battery pack as an electric power supply source, the battery pack including a plurality of secondary batteries each secondary battery including a plurality of terminals, a containing member that contains the plurality of secondary batteries to expose the plurality of terminals, a protective member that includes a plurality of openings and with which the plurality of secondary batteries contained in the containing member are covered to expose the plurality of terminals from the plurality of openings, and a wiring member coupled to the plurality of terminals exposed from the plurality of openings, wherein the protective member includes a hydrate-containing material.

* * * * *